Nov. 12, 1929.  J. R. MILLER  1,735,124
STUD ALIGNING TOOL
Filed July 12, 1927

Inventor
John Robert Miller

By Clarence A. O'Brien
Attorney

Patented Nov. 12, 1929

1,735,124

UNITED STATES PATENT OFFICE

JOHN ROBERT MILLER, OF WEST PALM BEACH, FLORIDA

STUD-ALIGNING TOOL

Application filed July 12, 1927. Serial No. 205,159.

My invention relates to tools adapted for aligning studs in the opening within which the same are secured and is adapted particularly for use in connection with the mounting of disc wheels on the hubs or spare tire carrier of automobiles.

An object of the invention is to provide a tool of this character by means of which the stud may be aligned for inserting through the opening in the disc wheel and which at the same time serves as a handle for lifting the wheel into place.

Another object is to provide a tool of this character which is extremely simple in construction, strong and inexpensive to manufacture.

Other objects and advantages resides in the special construction, combination and arrangement of the various elements forming the invention as more fully hereinafter described and claimed, reference being had to the accompanying drawings forming part hereof, wherein like numerals refer to like parts throughout and in which:

Figure 1:
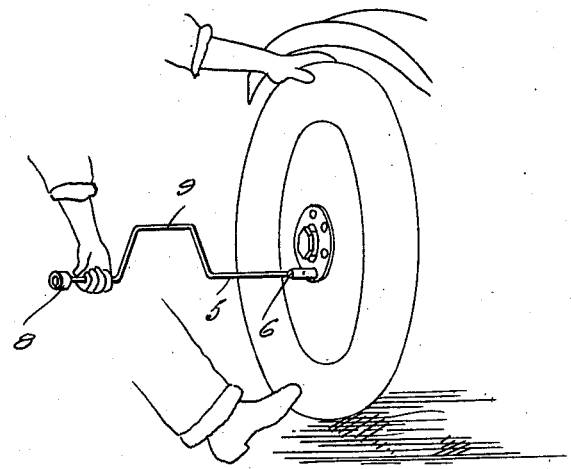
Figure 1 is a perspective view showing the device in use for mounting a disc wheel upon a hub.
Figure 2:
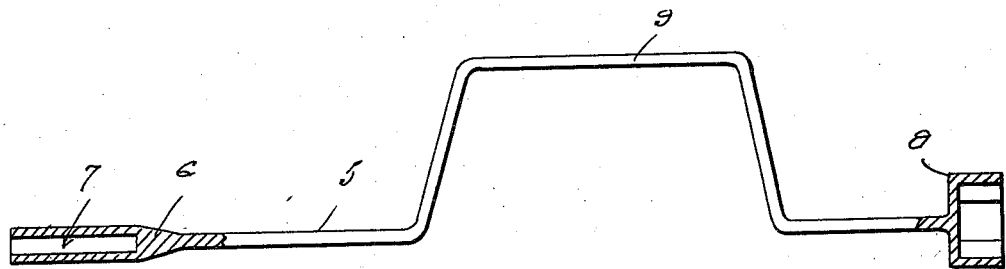
Figure 2 is an elevational view with parts in section.

My invention comprises a tool having a shank 5 at one end of which is formed an elongated head 6 provided with a smooth bore 7 extending longitudinally therein. The opposite end of the shank may be provided with a socket wrench head 8 suitable for removing the retaining nuts used for securing disc wheels to the hub of an automobile. Intermediate the ends of the shank may be provided the crank section 9 used for rotating the wrench.

Figure 3:
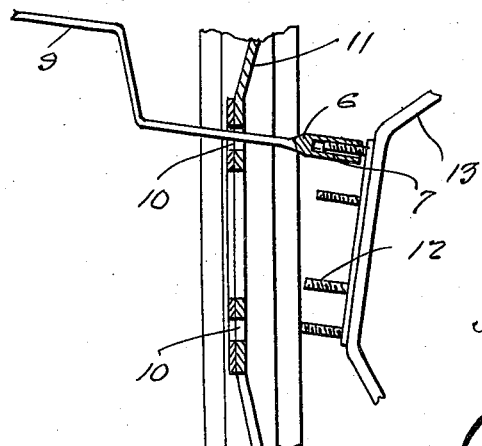
Figure 3 is a fragmentary sectional view of a disc wheel with my invention in operative use therewith for mounting the same upon a tire carrier.

In mounting disc wheels upon the hub or spare tire carrier of an automobile, it is extremely difficult to raise the wheels so as to register the opening 10 of the disc wheel 11 with the stud 12 by means of which the wheel is usually secured to the car. For the purposes of illustration, I have shown in Figure 3 the stud 12 provided on a tire carrier 13 which may be of any suitable construction.

In order to accurately register the stud with the opening the elongated head 6 is inserted through the opening 10 so that one of the studs 12 may be received within the bore 7 of the head. It is thus apparent that the wheel when moved in a direction towards the hub or tire carrier will be guided so that the opening 10 will be in alignment with the stud 12, the head 6 being sufficiently small in diameter to permit withdrawal of the same from the opening after the wheel is in position to be supported by the stud.

It is to be understood that the stud engaging head 6 of my invention may be used in conjunction with a tool of any character and if desired may comprise a separate and distinct tool of itself.

Having thus described my invention, I claim:

A tool of the class described comprising a shank adapted for use as a handle and insertable in the stud opening of a wheel, and a socket member formed at one end of the shank of an elongated formation and provided with a smooth bore adapted to receive a wheel attaching stud, said socket member being of a diameter greater than the shank and having its inner end tapering gradually as the same merges into the shank, whereby to constitute a guide for facilitating the free sliding movement of the socket in said opening during the removal of the socket.

In testimony whereof I affix my signature.

JOHN ROBERT MILLER.